United States Patent Office 3,330,428
Patented July 11, 1967

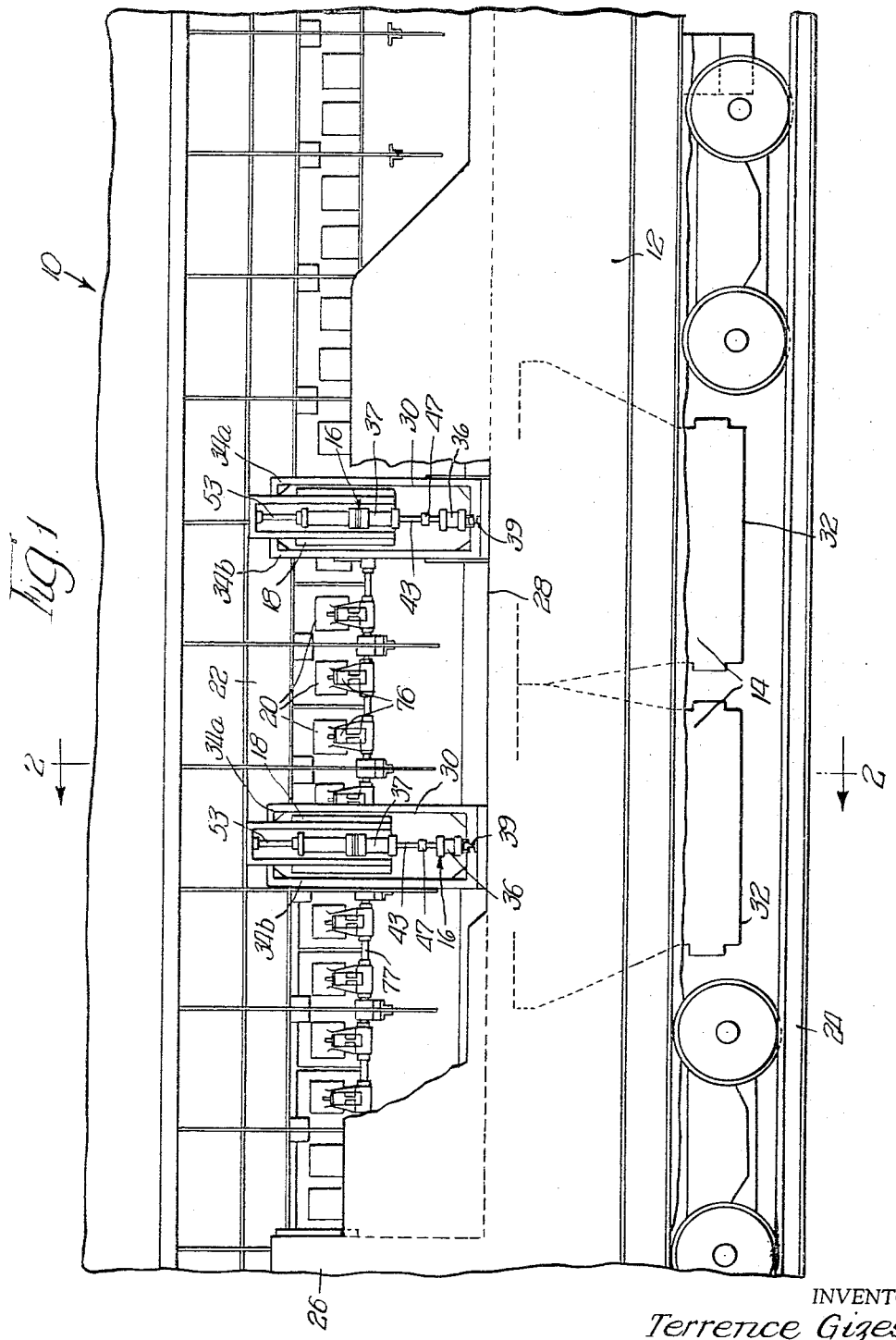

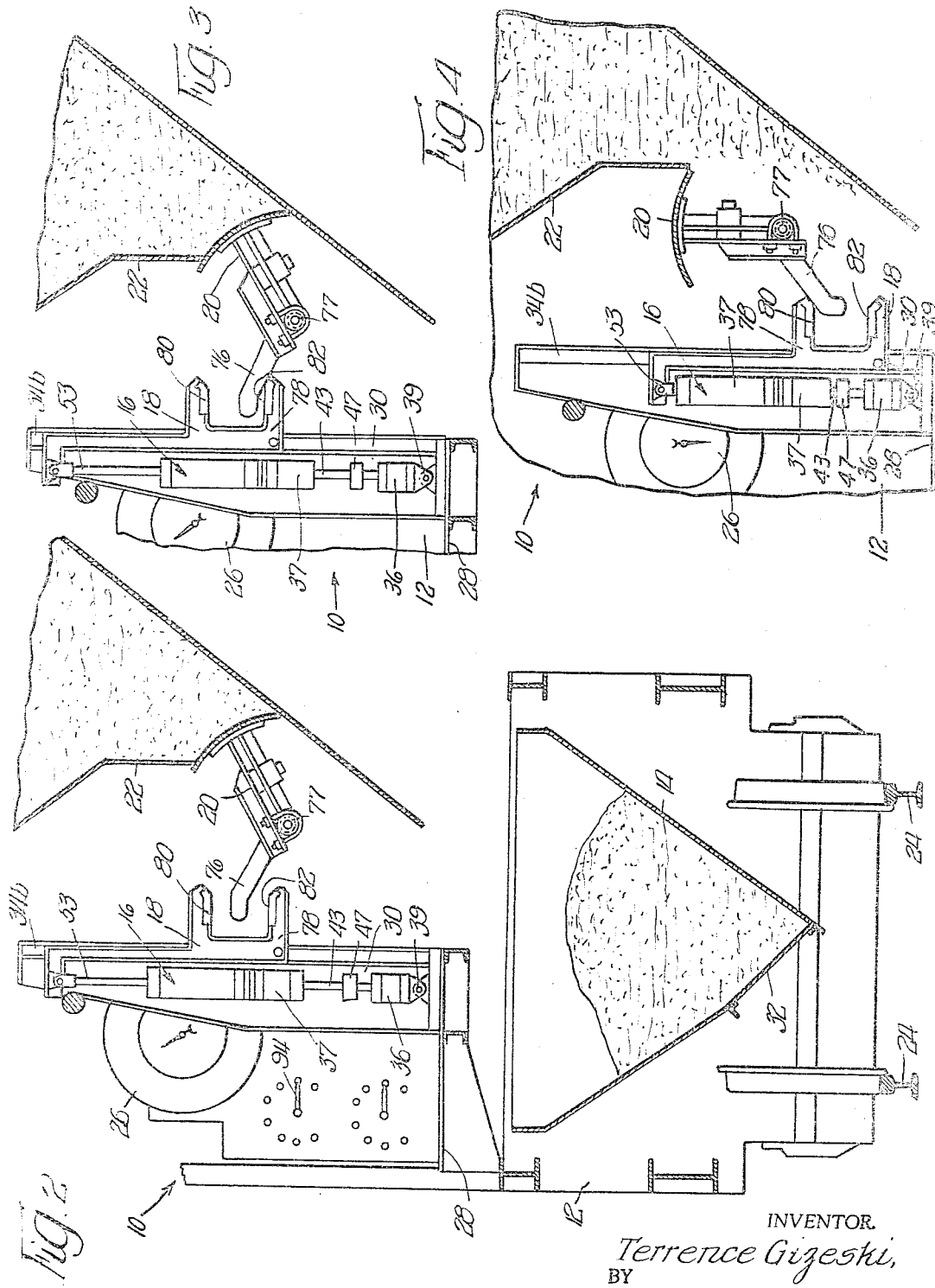

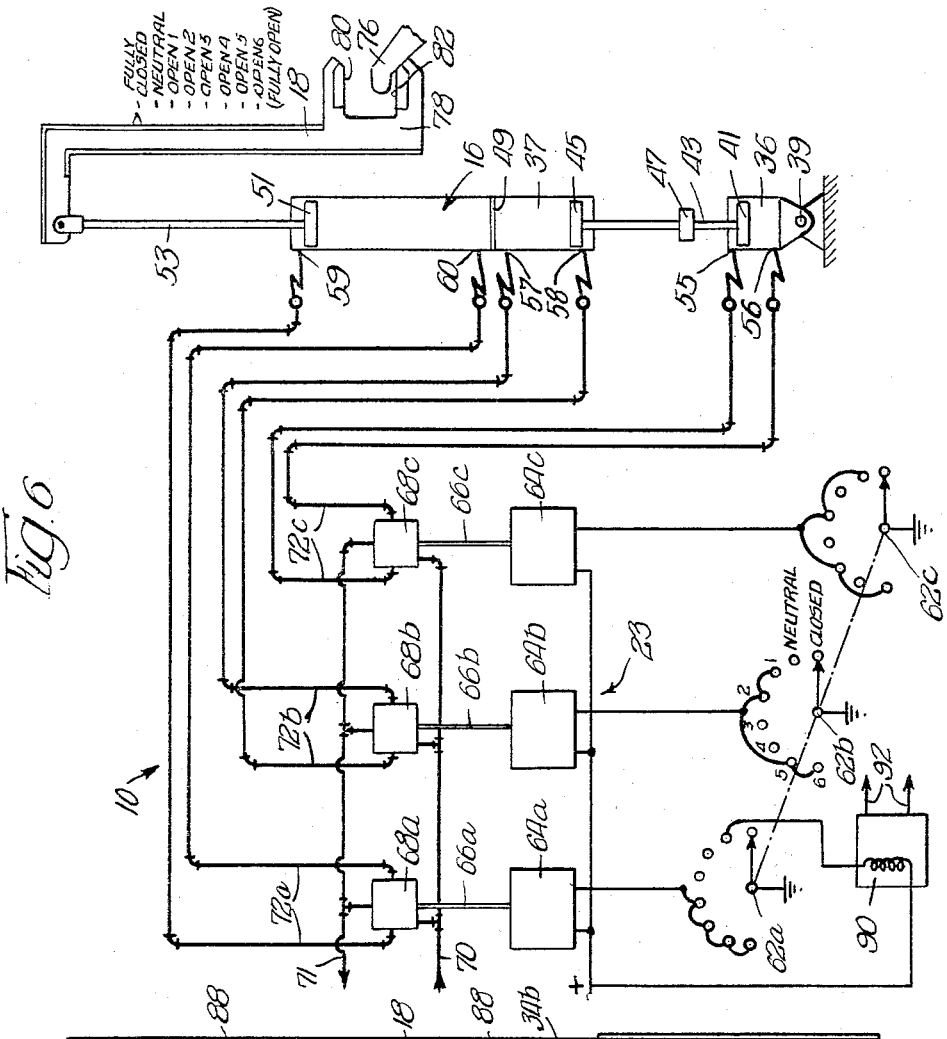
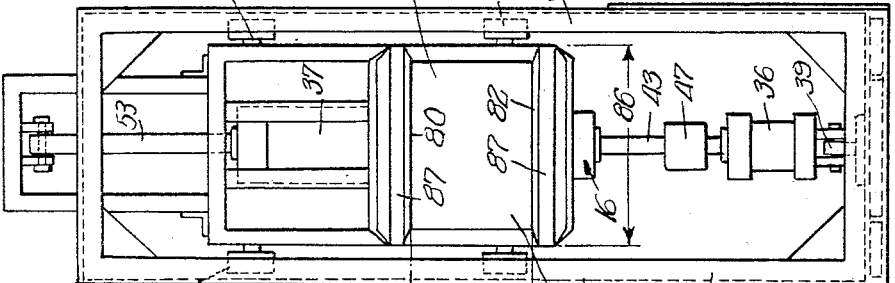
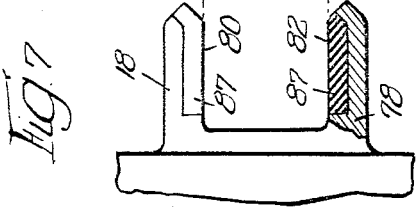

3,330,428
BIN GATE OPERATOR
Terrence Gizeski, Chicago, Ill., assignor to Ferguson, Hille & Associates, Inc., Chicago, Ill., a corporation of Illinois
Filed May 18, 1964, Ser. No. 368,224
1 Claim. (Cl. 214—41)

The present invention relates to an apparatus for discharging material bins, and more particularly to an automatic bin gate operator.

In a frequently employed materials handling system, used, for example, in blast furnace operations, a line of fixed material bins containing various materials are each arranged for dumping a controlled quantity of material into a movable material handling car when this car is moved to the bin discharge gate of a selected material bin. Among the disadvantages of existing arrangements is the time wasted, the manual energy expended, and the frequent human error, in manually opening and controlling the bin discharge gates. Providing mechanical arrangements to replace a reasonable cost these manual operations has proved difficult, one reason being the necessity to maintain a positive control over the rate of material flow through the bin gate as well as the time duration of the material flow.

Accordingly, it is a general object of the present invention to provide an automatic bin gate operator for solving the above-stated problems.

It is a further object of the invention to provide a simple and reliable bin gate operator which will rapidly and accurately actuate a selected bin gate into a selected position.

It is a specific object of the invention to accomplish the above and other objects by an automatic bin gate operator comprising in summary a movable car having fast operating digital operating and contacting means for selectively and controllably opening material bin gates. The digital bin gate operating means selectively moves the contacting means from a neutral or nonengaging position to a positive gate closing position or to one of a plurality of gate opening positions. The contacting means in turn engages and operates the selected material bin gate accordingly.

Further objects and advantages of the invention pertain to the particular arrangement and structure whereby the above identified objects and other objects of the invention are attained. The invention will be better understood by reference to the following specification and the drawings forming a part thereof, wherein:

FIGURE 1 is a representation of an embodiment of the invention, showing a movable car, partially broken away to show digital operating means thereon, and showing a line of material bin gates adjacent said car.

FIGURE 2 is a cross-sectional view taken along the line 2—2 of FIGURE 1.

FIGURE 3 shows a portion of the view of FIGURE 2, showing a material bin discharge gate in the closed position.

FIGURE 4 is the same view as FIGURE 3, showing the discharge gate in the fully open position.

FIGURE 5 is a front elevational view of the digital operating means and the contactor of the embodiment of FIGURE 1.

FIGURE 6 is a schematic representation of the control means, the digital operating means, and the contactor of the embodiment of FIGURE 1.

FIGURE 7 is a side elevational view of a portion of the contactor shown in FIGURE 5.

Referring now to the drawings, and particularly to FIGURES 1 and 2, there is shown therein an automatic bin gate operator 10 comprising a rail mounted scale car 12 having material hoppers 14 and having mounted on said car by a framework 30 a digital positioner 16 driving a jaw shaped contactor 18. The contactor 18 operates a selected discharge bin gate 20 of a material bin 22, and thereby controllably discharges material into the hopper 14 when the digital positioner 16 is actuated by a control means 23 shown in FIGURE 6.

The particular scale car 12 illustrated here is mounted in the manner of a railroad car upon rails 24 placed parallel and adjacent to the bin gates 20 of a line of numerous material bins 22. Thereby the scale car 12 may be moved to a position where the material from the material bins 22 will discharge into the hoppers 14 on the scale car when a particular bin gate 20 is opened. Each of the two hoppers 14 shown on this scale car 12 is independently suspended and connected to the dials of a weighing scale 26 mounted at one end of the scale car, so that the weight of the material present in each hopper may be determined. The bottom of each hopper 14 is provided with a discharge door 32 so that the scale car may be moved to a blast furnace and the weighed contents of the hopper discharged through this discharge door. The scale car 12 is preferably provided with its own electrical traction motor and braking system for controllably driving and positioning the scale car.

As seen in FIGURE 2, rigidly cantilevered from one side of the car 12 is an extended platform 28 upon which a person operating the car may walk. At the outer edge of this platform 28 there is preferably rigidly secured, by bolting or the like, a framework 30. It is within the framework 30 that the digital positioner 16 is mounted.

The digital positioner 16 is preferably a multiple piston pneumatic or hydraulic positioner providing a plurality of incremental digital positions, as described below. It employs an adaptation of the novel principle of digital valve regulation explained in my prior Patent No. 3,072,146, issued January 8, 1963. One digital positioner 16 is associated with each hopper 14, preferably mounted directly above the hopper.

The structure of the digital positioner 16 is best shown in FIGURE 6. Included therein are two closed cylinders 36 and 37, the lower end of the cylinder 36 being pivotally attached to the bottom of the framework 30 by a pin connector 39. Within the cylinder 36 is a fluid-tight piston 41, the movement of which is limited by the closed ends of the cylinder 36. Secured to the piston 41 and extending through the upper end of the cylinder 36 is a piston rod 43 which extends up through the lower end of the cylinder 37 and connects therein to a second piston 45. A variable stop 47 may be provided to limit the movement of the piston rod 43. Within the cylinder 37 is a fixed cylinder head 49, so that in effect the cylinder 37 comprises two cylinders. Within the upper portion of the cylinder 37 there is slidably mounted a third piston 51, which is secured to an extended piston rod 53. The opposite end of this piston rod 53 is then pivotally connected to an extremity of the contactor 18, and vertically drives the contactor. Fluid connections 55 and 56 into the cylinder 36 are provided at the top and bottom respectively of the cylinder for fluid pressure lines so that a fluid pressure differential may be provided between the upper and lower faces respectively of the piston 41, thereby supplying the force for driving the piston. Similarly there are provided connections 57 and 58 for driving the piston 45 and connections 59 and 60 for driving the piston 51. It will be noted that the cylinder 37 is not fixed, and is vertically movable with respect to the cylinder 36.

By applying fluid pressure to one side or the other of a selected combination of the above pistons, the total "stroke length" or positional output of the digital positioner may be incrementally changed. For the particular structure above the positioner 16 is operative into any one of eight digital positions, which are shown in FIGURE 6 as "Fully Closed," "Neutral" and six incremental positions for variably opening the bin gate, including "Fully Open." These positions may, if desired, be equally spaced, as described in my prior patent No. 3,072,146.

One type of control means 23 for operating the digital positioner 16 is illustrated in FIGURE 6 in schematic form. For an eight digital position operation, as shown here, the control means 23 preferably includes three multiple position switches 62a, 62b and 62c. Each of these three multiple position switches preferably includes eight contacts and a wiper, and the switches are ganged so that the wipers of all three switches are simultaneously switched to the same respective switch contacts. Each multiple position switch is connected in series with an electrical current source and with one electrical solenoid actuator, 64a, 64b or 64c. The contacts of each switch are wired so that in certain selected positions of the ganged switches electrical current will flow through certain of the electrical solenoids.

The electrical solenoids 64a, 64b and 64c provide a mechanical movement output through the shafts 66a, 66b and 66c which actuate dual position fluid valves 68a, 68b and 68c. Each of the above dual position valves is supplied with fluid under pressure by means of a fluid inlet line 70 and is also connected to a fluid outlet line 71. The dual position valves are preferably of a conventional type designed to switch fluid under pressure to one line or the other of a connected pair of fluid pressure lines (72a, 72b or 72c, respectively). The opposite ends of each of these fluid pressure lines are connected through the previously described fluid connections 55–60 into the fluid cylinders 36 or 37, and thereby the pistons may be driven to one end or the other of their respective cylinders in various combinations to achieve the positional output selected by the position of the switches 62a, 62b and 62c.

A further feature of the control means 23 illustrated in FIGURE 6 is a relay 90, which prevents the scale car 12 from being moved unless the control means is switched to the neutral position. As shown here the relay 90 may be a conventional electrical relay connected to the neutral position contacts of one of the multiple position switches, and having a pair of output leads 92 connected in series with the electrical power source for the scale car traction motor. This insures that the contactor 18 must be so positioned that it cannot strike one of the bin gate lever extensions as the car is moved. A further mechanical or electrical locking arrangement (not shown) may be employed to prevent the control means from being switched out of the neutral position while the car is in motion, for the same safety reasons.

In order to employ the novel contactor 18 of the invention described herein it will generally be necessary to modify somewhat the existing material bin gates. For the type of bin gate 20 shown in the enclosed drawings, the modification consists merely in fastening a lever arm extension 76 to the material bin gate 20 by bolting or other suitable means. The type of bin gate 20 shown herein is the reverse quadrant roller type, which variably opens to discharge the material bin 22 by partial rotation of the bin gate about a fixed shaft 77. This may be accomplished by applying force to the lever arm 76.

The bin gate contactor must be so adapted as to enable it to actuate any one selected bin gate 20 rapidly and accurately. The contactor 18 of the invention, as particularly shown in FIGURES 5 and 7, includes a jaw shaped portion 78 having an upper jaw face or area 80 and a lower jaw face or area 82. The jaw shaped portion 78 has a wide effective jaw opening 84 and a wide jaw width 86, as shown in FIGURES 5 and 7. One end of the lever extension 76 of a bin gate is inclosed within this jaw when the scale car is moved adjacent that bin gate. Vertical movement of the contactor 18 causes one or the other of the faces of the jaw to contact and move the end of the lever extension 76. To reduce vibration and noise in the actuation of the bin gate 20 the upper and lower jaw areas 80 and 82 may both be provided within an insert 87 or covering of rubber or other shock absorbing material. The dimension of the jaw opening 84 is preferably several times greater than the thickness of that part of the lever extension 76 within the jaw. The jaw width 86 can be as great as the distance between bin gates. However, preferably the jaw width should be such that whenever the lever extension 76 is within the jaw shaped portion 78 the scale car will be so situated with respect to the particular material bin 22 that the material will all discharge into the corresponding hopper 14.

In the embodiment shown herein particularly in FIGURE 5 the contactor 18 is confined to a vertical path of travel by means of rounded slides 88 fastened to and extending out from the contactor 18 at two points on each side of the contactor. The slides 88 are adapted to fit loosely within vertical channel members 34a and 34b, which are part of the framework 30. The digital positioner and the contactor 18 are designed and adjusted for a vertical height such that when the digital positioner is in one of the previously described digital output positions (the neutral position), the lever extension 76 of a closed bin gate will extend into the space formed between the jaw areas 80 and 82 and be spaced approximately equidistantly between the two jaw areas. A preferred clearance between each jaw surface area and the lever extension 76 is approximately four inches.

From the standpoint of the personnel operating the apparatus of the invention the actual operation is very simple. First the operator controlling the movement of the scale car engages the scale car traction motor (not shown) until the scale car is moved to the position where the hopper 14 in which it is desired to place material is directly adjacent the selected material bin. This positioning of the scale car may be accomplished manually or by some automatic positioning means. As noted above, the contactor 18 must be in the neutral position during the movement of the scale car. Hence as the scale car moves down its track the lever extension 76 of various bin gates will freely pass between the wide jaw opening 84 of the jaw shaped portion 78 of the contactor 18. When the scale car is halted in front of the selected material bin the end of the lever extension 76 for that material bin will be located somewhere in this space between the upper and lower jaw areas 80 and 82. As discussed above, the positioning of the scale car need not be precise as the wide jaw width 86 of the contactor allows considerable latitude in the positioning of the car along the track, thus the traction motor and/or braking system of the scale car need not be constructed for a precise or abrupt stop in the movement of the scale car. Similarly, the large vertical clearance provided within the large jaw opening 84 on either side of the lever 76 allows for considerable variation in the height of the scale car due to uneveness in the scale car track and differing loads in the car, as well as allowing for variations in the positions of the various bin gate levers, and changes due to wear in the system.

Once the scale car is halted before the selected material bin, the operator merely rotates a knob 94 (as shown in FIGURE 2) to a selected switch position. The knob 94 operates the ganged multiple position switches 62a 62b and 62c shown in FIGURE 6 and thereby operates the control means 23. The contactor is immediately rapidly moved by the digital positioner to the selected digital position. The upper jaw area 80 of the contactor thereby strikes the upper surface of the lever 76 and moves it downward, as can be seen in FIGURE 4, thus forcing the bin gate 120 to rotate to the selected angle of opening. (The fully open position is shown in FIGURE 4). If the material is discharging from the bin at too rapid or too slow a rate the operator simply moves the knob 94 to an adjacent switch position, which partially opens or closes to bin gate by a precise positional increment provided by the digital positioner. When the desired weight of material is present in the hopper car (as indicated by the dial of the weighing scale 26 or a suitable type of automatic switch) the operator simply rotates the knob 94 to the fully closed position. The contactor 18 thereby is immediately moved upwardly to the fully closed position, illustrated in FIGURE 3. In so doing, the lower jaw area 82 strikes and forceably moves the lever extension 76 to rotate the bin gate to the fully closed position. After closing the bin gate, the operator returns the knob 94 to the neutral position.

A significant advantage of the use of a digital positioner for the operation of the bin gate is the accurate repeatability of operation. Once the maximum rate of material flow at which material can be discharged from a particular bin with safety and controllability is determined, the switch position for that rate of flow may be noted and the knob 94 may then be switched to that selected opening position each time the scale car is loaded from that material bin. Due to the digital nature of the system the bin gate will be opened to that same angle of opening each time by the operator selecting the same switch position. This positive control over the rate of flow of material is particularly important for fast flow materials such as sinter, etc.

As can be seen from the above description, the actual operation for the operating personnel is extremely simple and effective. Approximately a seven seconds time savings can be realized at each car "spotting" and material bin discharge cycle over the existing manual bin gate operations. The rapid bin gate operation and fingertip control results in a more accurate weight determination and eliminates the heavy manual work load previously associated with manually opening and closing the bin gates.

Another advantage of the structure of the invention is that it is readily adaptable to fully automatic operation. That is, the function of the personnel operating the complete bin gate operator can be performed by a remote computer or other device which would remotely actuate the control means by a digital input, and also position the car automatically. Thus, the invention provides a bin gate operator which may be quickly and inexpensively adapted to a fully automated plant operation. While the bin gate operator 10 described above is particularly adapted for cooperation with one type of scale car to open a particular type of bin gate, it is to be appreciated that the invention is not limited to the specific structures so described. Further, numerous modifications and improvements may be made in the entire apparatus of the invention by those skilled in the art. It is intended to cover in the appended claim all such variations and modifications as are within the true spirit and scope of the invention.

What is claimed is:

Automatic material bin gate operating apparatus comprising,
a plurality of spaced material bins having discharge openings,
a corresponding plurality of reverse quadrant bin gates each associated with corresponding material bin to gate said discharge openings and being operable between a fully opened and a full closed position,
a corresponding plurality of levers each attached to a corresponding bin gate and movable for selectively positioning said bin gate between said fully open and said fully closed position,
a movable material-receiving car positionable adjacent a selected material bin,
digital bin gate operating means mounted on said movable car,
a contactor included in said digital operating means for engaging said lever and being operable in one direction between a neutral position and closed position and operable in the opposite direction between a neutral position and an open position,
a cumulative series of fast operating fluid pistons connected to said contactor means and selectively operating said contactor into said neutral position and into said closed position and into any one of a plurality of discrete incremental open positions,
a digital control circuit for operating said series of fluid pistons in an operating cycle from said neutral position into any one of said open positions and thence into said closed position and thence into said neutral position,
said contactor in its said closed position engaging and forcibly operating one of said bin gates into said bin gate closed position and in said neutral position being disengaged from said bin gate in said bin gate closed position and in any one of said discrete open positions engaging and forcibly operating said bin gate into a correspondingly discrete open position,
and interlock circuit means actuated only when said conductor is in said neutral position for controlling said car movement.

References Cited

UNITED STATES PATENTS

| 1,508,560 | 9/1924 | Ledeboer | 214—41 |
| 1,731,271 | 10/1929 | Schellentrager | 214—41 |
| 1,738,939 | 12/1929 | Boynton | 214—41 |
| 2,750,091 | 6/1956 | Mattimoe et al. | 141—83 X |
| 3,072,146 | 1/1963 | Gizeski | 137—552 |

FOREIGN PATENTS 636,062   3/1962   Italy.

LAVERNE D. GEIGER, *Primary Examiner.*

E. J. EARLS, *Assistant Examiner.*